United States Patent [19]
Dent

[11] Patent Number: 5,666,649
[45] Date of Patent: Sep. 9, 1997

[54] COMMUNICATIONS SYSTEM HAVING VARIABLE SYSTEM PERFORMANCE CAPABILITY

[75] Inventor: Paul W. Dent, Stehag, Sweden

[73] Assignee: Ericsson Inc., Research Triangle Park, N.C.

[21] Appl. No.: 299,420

[22] Filed: Sep. 1, 1994

[51] Int. Cl.[6] .................................................. H04B 7/26
[52] U.S. Cl. .......................... 455/445; 455/69; 455/406; 455/447; 455/450
[58] Field of Search ............................. 455/33.1–33.4, 455/34.1, 34.2, 53.1, 54.1, 54.2, 56.1, 69; 379/59, 60

[56] References Cited

U.S. PATENT DOCUMENTS

| | | |
|---|---|---|
| 4,989,230 | 1/1991 | Gillig et al. . |
| 5,127,042 | 6/1992 | Gillig et al. . |
| 5,212,684 | 5/1993 | MacNamee et al. . |
| 5,247,699 | 9/1993 | Hartman . |
| 5,257,398 | 10/1993 | Schaeffer . |
| 5,313,653 | 5/1994 | Sasuta ................................ 455/54.2 X |
| 5,386,589 | 1/1995 | Kanai ................................ 455/69 |
| 5,392,458 | 2/1995 | Sasuta et al. .................. 455/33.1 X |
| 5,504,939 | 4/1996 | Mayrand et al. ................ 455/33.1 |

FOREIGN PATENT DOCUMENTS

| | | |
|---|---|---|
| 0 680 159 A2 | 11/1995 | European Pat. Off. . |
| 90/04293 | 4/1990 | WIPO .................. 455/33.1 |
| WO92/20197 | 11/1992 | WIPO . |
| WO94/05130 | 3/1994 | WIPO . |
| WO94/08434 | 4/1994 | WIPO . |

OTHER PUBLICATIONS

R. Mertens and Dr. Nils Mäthner, "Mobilfunk Für Verkehrstelematik" *Elektronik*, pp. 50–53, & pp. 58 and 60, 43(1994) 23 Aug., No. 17, Poing, Germany, Feb. 17, 1994.

Patent Abstracts of Japan, vol. 18, No. 99 (E–1510), published on Feb. 17, 1994 corresponding to Japanese Patent Publication No. JP5300072 (published Nov. 12, 1993).

Written English–language translation of R. Mertens and Dr. Nils Mäthner, "Mobilfunk Für Verkehrstelematik" *Elektronik*, pp. 50–53, & pp. 58 and 60, 43(1994) 23 Aug., No. 17, Poing, Germany, Feb. 17, 1994.

*Primary Examiner*—Chi H. Pham
*Attorney, Agent, or Firm*—Burns, Doane, Swecker & Mathis, L.L.P.

[57] ABSTRACT

System performance in a mobile communications system is improved by detecting whether the mobile unit has a particular capability, and adjusting operation of the base station to improve system performance in response to detection that the mobile unit has the particular capability. The capability may be radio reception with lower signal to interference (C/I) requirements. In this case, system performance may be improved by adjusting base station transmitter power to a reduced power range in response to detection that the mobile unit has the particular capability, thereby creating less interference to mobiles that require a higher C/I, and increasing system capacity. Detection may include receiving a signal from the mobile unit, wherein the signal is encoded to indicate whether the mobile station has the particular capability. Alternatively, the signal may be a signal that is encoded to identify from which one of a plurality of mobile units the identifying signal was received. In this instance, the base station uses the identifying signal to retrieve a capability-indicating code from a database, which may be located in the subscriber's home exchange. In another aspect of the invention, a lower of two billing rates is selected for billing a mobile unit in response to detection that the mobile unit has the particular capability. This passes along system savings to the subscriber, and creates an incentive for the subscriber to purchase the usually more expensive mobile unit that has the particular capability.

13 Claims, 3 Drawing Sheets

COMMUNICATIONS SYSTEM HAVING VARIABLE SYSTEM PERFORMANCE CAPABILITY

BACKGROUND

The present invention relates to cellular mobile telephone systems, and more particularly, to methods and devices for accommodating various designs of subscriber telephones based on different trade-offs between cost and performance.

In a cellular telephone system, capacity to support as many simultaneous conversations as possible is of the essence to the service providers because it directly impacts their revenue. At the same time, cellular telephones are a consumer product, making low cost of the essence to the retail distributors. It is possible to design systems and telephones that are capable of increasing capacity at the expense of retail cost. It is also possible to reduce the cost of such hardware at the expense of capacity. This conflict could be handled by having the service providers offer a subsidy to the retail outlet on more expensive telephones whose use they may wish to encourage for capacity reasons. This has the disadvantage, however, of restricting freedom of independent competition for equipment and services because the retail customer cannot be permitted to acquire the telephone with the maximum subsidy from a first operator and then convert the subscription to a second operator having lower subscription and call charges because he does not offer such subsidies.

One such example of a more expensive telephone that has advantages for the service provider but only disadvantages for the retail customer is the use of the diversity receiving technique. It can be shown that the provision of two separate receiving chains and antennas in a mobile telephone can reduce the signal-to-interference ratio (C/I) required for good quality communication by as much as 7 dB. Since the number of times a radio frequency channel can be re-used for separate conversations in a given geographical zone is directly related to the required C/I, the capacity of the telephone network can be approximately doubled by use of mobiles capable of diversity reception.

Because not all mobile subscribers can be expected to purchase the more expensive units, it is desirable to provide a way of accommodating mobile telephones both with and without the above exemplary improvements and corresponding frequency-reuse restrictions in the same geographical area. It is further desirable to provide the retail customer with an incentive to acquire the more complex product, since this permits the mobile communications system to operate at increased capacity.

SUMMARY

In accordance with one aspect of the present invention, the foregoing and other objects are achieved in a method and apparatus for operating a base station in a cellular communications system including the base station and a mobile unit. First, it is detected whether the mobile unit has a particular capability. Then, the operation of the base station is adjusted to improve system performance in response to detection that the mobile unit has the particular capability.

In accordance with one embodiment of the invention, detecting that the mobile unit has the particular capability comprises receiving a signal from the mobile unit, wherein the signal is encoded to indicate whether the mobile station has the particular capability.

Alternatively, detecting that the mobile unit has the particular capability may comprise receiving an identifying signal from the mobile unit, wherein the identifying signal is encoded to identify from which one of a plurality of mobile units the identifying signal was received; and then using the identifying signal to retrieve a capability-indicating code from a database.

In another aspect of the invention, the particular capability is a lower signal-to-interference requirement, as might be achieved by means of diversity reception. Furthermore, the step of adjusting operation of the base station comprises adjusting base station transmitter power to a reduced power range in response to detection that the mobile unit has the particular capability. This creates less interference to low-cost mobiles that need higher C/I, and increases system capacity.

In yet another aspect of the invention, base station operation adjustment comprises selecting a lower of two billing rates for billing the mobile unit in response to detection that the mobile unit has the particular capability. This reflects the fact that high performance mobiles take up less of the network's capacity, and encourages the retail customer to acquire the high performance unit.

BRIEF DESCRIPTION OF THE DRAWINGS

The objects and advantages of the invention will be understood by reading the following detailed description in conjunction with the drawings in which:

FIG. 4 is a block diagram of an exemplary system for effecting capability-sensitive billing rates in accordance with one aspect of the present invention.

DETAILED DESCRIPTION

A more efficient method of allocating radio frequency channels than presently-used, fixed-frequency plans is described in co-pending U.S. patent application Ser. No. 08/245,031, filed May 17, 1994, by Andersson et al., entitled "A Method and Device for the Utilization of Channels in a Radio Communications System," which is hereby incorporated by reference. Another efficient method of allocating radio frequency channels than present plans is described in a co-pending U.S. patent application Ser. No. 08/207,032, filed Mar. 7, 1994, by J. Haartsen entitled "Method and System for Channel Allocation Using Power Control and Mobile-Assisted Handover Measurements", which is commonly assigned to the same assignee as that of the present application, and which is hereby incorporated by reference. Other methods of assigning channels suitable for TDMA systems are described in a co-pending U.S. patent application Ser. No. 08/299,255 by Paul W. Dent, entitled "A Time and Frequency Slot Allocation System and Method," filed Sep. 1, 1994, which is also commonly assigned to the same assignee as that of the present application, and which is hereby incorporated by reference. This method continually estimates the potential quality of all available channels at the base station and assigns the best channel to each mobile conversation. The adaptive channel allocation methods disclosed in the aforementioned applications allow the quality in both the base-mobile and mobile-base communications directions to be predicted and taken into account in assigning a channel.

Figure 1:
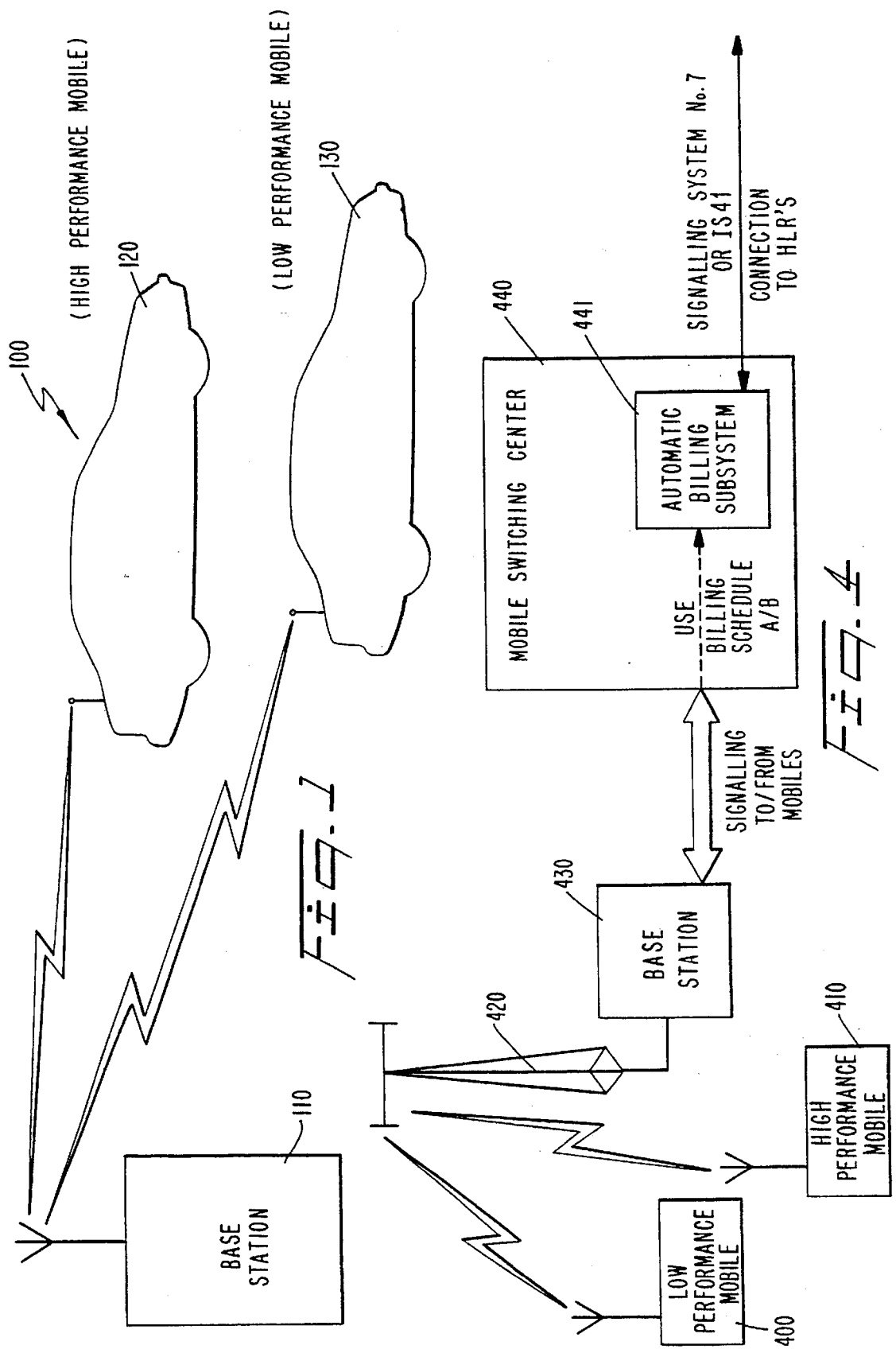
FIG. 1 is a block diagram of a cell in a mobile communications system having a base station that operates in accordance with the present invention.

In accordance with one aspect of the present invention, the adaptive channel allocation method is modified to take into account mobiles in the system having different C/I needs. That is, the target C/I's that the system aims to achieve are changed in dependence on the particular capability of each mobile unit. Along with this, the cost functions are changed to penalize under-achievement of the target C/I's. This will now be described with reference to FIG. 1, which illustrates a cell 100 in a mobile communications system. The cell 100 includes a base station 110, and a plurality of mobile units, of which two are illustrated. A high-performance mobile 120 and a low-performance mobile 130 are each served by the base station 110 so long as each is located within the cell 100. The high-performance mobile 120 has reduced signal-to-interference (C/I) requirements arising, for example, from its utilization of diversity receiving techniques. The low-performance mobile 130 does not utilize these techniques, and therefore has C/I requirements which are higher than those of the high-performance mobile 120.

As explained earlier, it is advantageous for the base station 110 to take advantage of the high-performance mobile's 120 better performance capabilities in order to increase system capacity. Thus in accordance with one aspect of the present invention, the base station 110 communicates with each of the high- and low-performance mobiles 120, 130 in accordance with the flowchart illustrated in FIG. 2. At a high-level, this base station 110 operation is illustrated by the superblocks that are drawn in dotted-lines in FIG. 2. In superblock 210, the base station 110 detects the capabilities of the mobile unit with which it intends to communicate. In superblock 220, the operation of the base station 110 is adjusted in correspondence with the detected capabilities.

Figure 2:
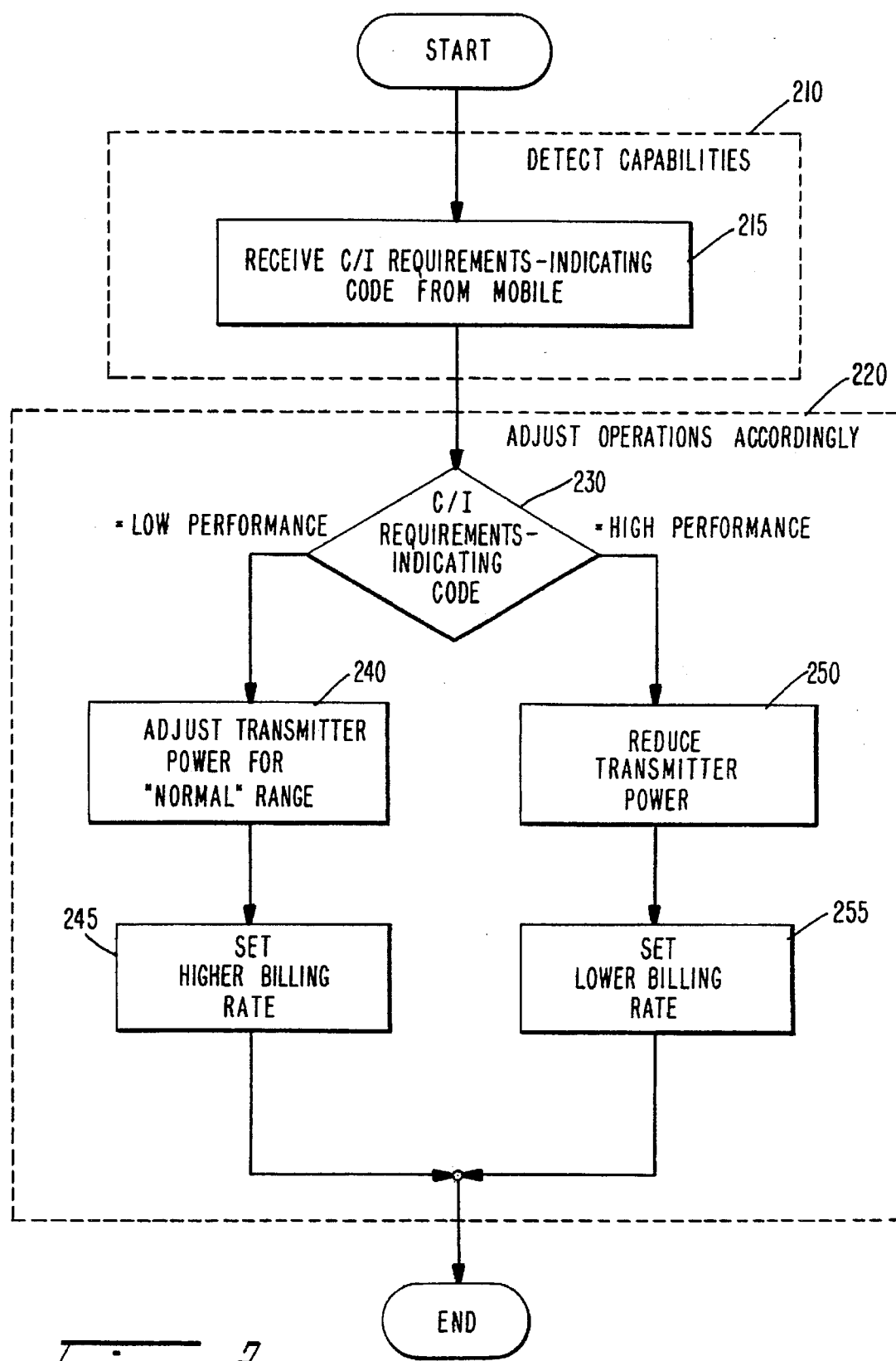
FIG. 2 is a flow chart of the operation of a base station in accordance with several aspects of the present invention.

A more detailed example of base station operation in accordance with the present invention is shown in the blocks of FIG. 2 that are drawn in solid lines. In this illustration, the capability to be detected is an improved C/I requirement, as explained above. Thus, the base station 110 begins its operation in block 215 by receiving a C/I requirement-indicating code from whichever of the mobile units 120, 130 it is communicating with. Of course, the C/I requirement-indicating code may directly contain the required information. For example, a protocol could be established whereby a mobile unit 120, 130 responded with a 2-bit code encoded as follows:

| Code | Meaning |
|------|---------|
| 00 | 6 dB C/I can be accepted |
| 01 | 12 dB C/I can be accepted |
| 10 | 18 dB C/I can be accepted |
| 11 | 24 dB C/I can be accepted |

The above encoding permits the requested C/I to be determined directly by means of the equation:

*Requested C/I=6(Code+1)dB.*

With the above encoding, Code=00 might correspond to a packet-data transmission mode with or without diversity. Code=01 might correspond to a mobile telephone that is equipped with a diversity antenna/receiver for receiving voice traffic. Code=10 corresponds to a typical Advanced Mobile Phone Service ("AMPS"), non-diversity mobile telephone. Code=11 might correspond to a user-selected demand for a particularly clear ("Hi Fi") channel, for which he is willing to pay. (Such a channel might be desirable, for example, for international calling.)

If it is desired to provide a system that does not impact the design of the mobile units themselves, then, as an alternative to having the mobile unit 120, 130 explicitly send a C/I requirement-indicating code, the code received from the mobile unit can be the mobile unit's own telephone number or electronic serial number. Such information is typically communicated between the mobile unit and the base station in prior art systems, and its encoding and method of communication are well-known to those skilled in the art. In this instance, the base station 110 uses the received telephone number or electronic serial number to access a database located in the subscriber's home exchange, and to retrieve therefrom the corresponding C/I requirement-indicating code.

Next, in block 230, a branch is made in correspondence with the value of the received C/I requirement-indicating code. If the code indicates that the base station 110 is communicating with the low-performance mobile 130, then block 240 is executed, in which the base station 110 adjusts its transmitter power so that it lies in what will be referred to here as a "normal" range.

Alternatively, if the code indicates that the base station 110 is communicating with the high-performance mobile 120, then execution proceeds from block 230 to block 250, in which the base station 110 reduces its transmitter power to a reduced range that is below that of the "normal" range. This enables the base station 110 to still satisfy the C/I requirements of the high-performance mobile 120 while creating less interference to the low-performance mobile 130 that requires a higher C/I.

As indicated above, the base station 110 may additionally adapt its transmitter power, within alternatively the "normal" and reduced ranges, in correspondence with such factors as the mobile station's distance from the base station 110 and prevailing interference conditions. These techniques, which are not illustrated in FIG. 2, are fully described in co-pending U.S. patent application No. 08/207,032, which was incorporated by reference above.

Figure 3:
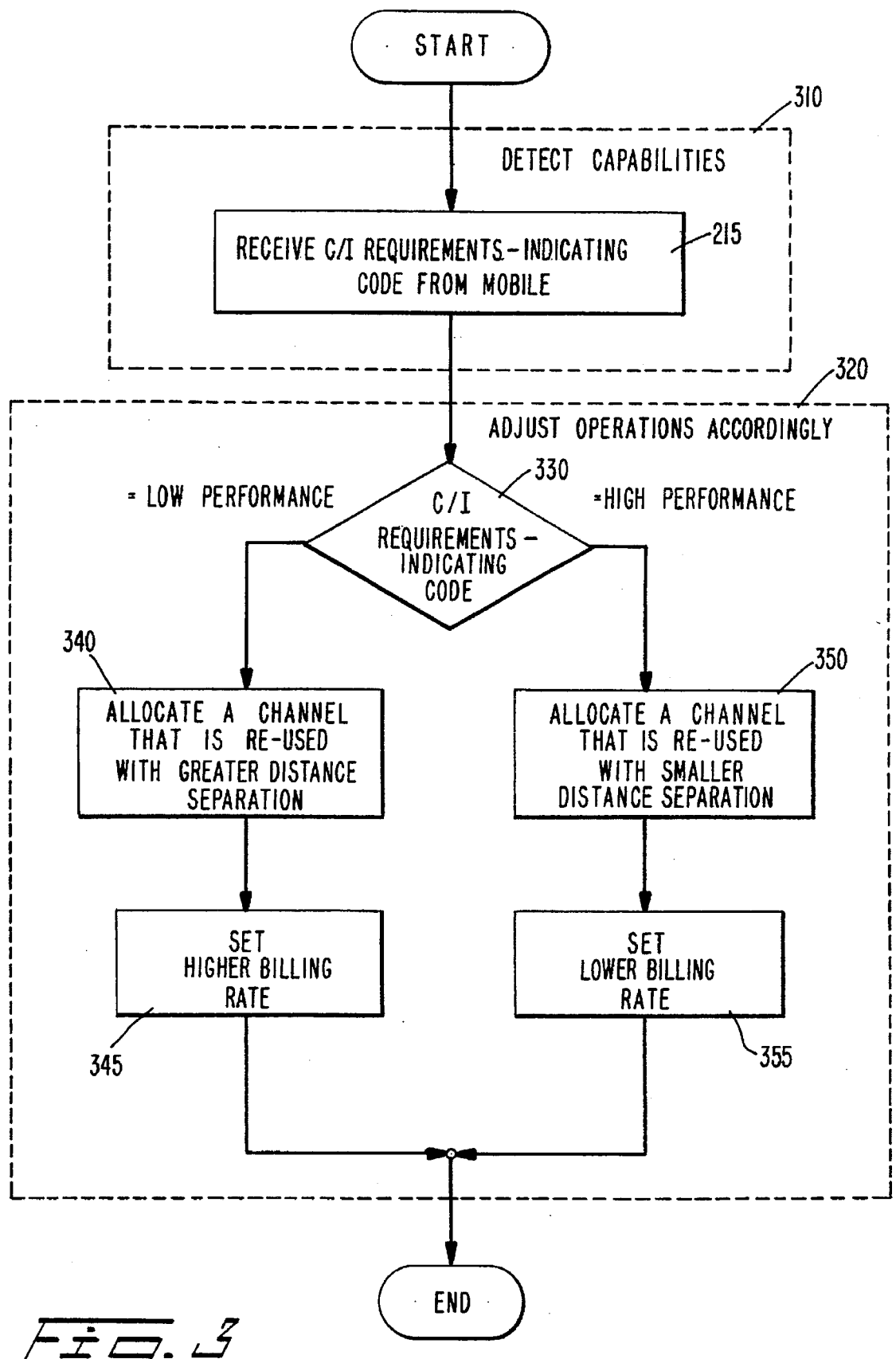
FIG. 3 is a flow chart of the operation of a base station in accordance with several aspects of an alternative embodiment of the invention.

As an alternative to the method described above with respect to FIG. 2, FIG. 3 shows a variant that is identical in all respects to FIG. 2 except for the way the operation of the base station 110 is adjusted in correspondence with the detected capabilities. In this alternative embodiment, instead of adjusting the power level of a signal to be used for communication with a mobile unit, selection of a channel for use by the mobile unit is made in dependence on the capabilities of the mobile unit. Because the base station 110 may assign any of a number of different channels (frequencies) for use by the mobile unit, reduction in interference and increased system capacity may be achieved by assigning, for use by high performance mobile units 120, a frequency having a closer re-use proximity (i.e., the distance from the base station 110 and the nearest other base station that also may assign the same frequency for use by a mobile unit) than that of other assignable frequencies that are also allocated to the base station 110. Beneficial effects are produced because channels having closer re-use proximities must, of necessity, be broadcast at lower power levels than other channels, in order to avoid interference with neighboring cells.

Thus, at step 330, if the received C/I requirements-indicating code shows that the base station 110 is communicating with the low-performance mobile 130, then block 340 is executed, in which case the base station allocates a channel that is re-used with greater distance separation (i.e., greater re-use proximity, so that the transmitter power for that channel lies in the "normal" range) than that of other assignable channels. If, on the other hand, the received C/I requirements-indicating code shows that the base station 110 is communicating with the high-performance mobile 120, then at block 350, the base station 110 allocates a channel that is re-used at a smaller re-use distance (i.e., a channel having a closer re-use proximity is assigned). This enables the base station 110 to still satisfy the C/I requirements of the high-performance mobile 120 while allowing greater capacity for increased frequency re-use.

In accordance with another aspect of the invention, the base station 110 uses knowledge of the mobile station's C/I requirements to determine the billing rate to the subscriber for the conversation, as measured, for example, in cents per minute. That is, after adjusting transmitter power to lie in the "normal" range (block 240), the base station 110 then executes block 245 where a higher billing rate is set for the conversation. Similarly, after adjusting transmitter power to lie in the reduced range (block 250), the base station 110 then executes block 255 where a lower billing rate is set for the conversation. This dichotomy in billing rates reflects the fact that the high-performance mobile 120 takes up less of the network's capacity. By letting it be known that this savings will be passed along to the subscriber, any retail customer who anticipates spending a lot of time on the phone will be encouraged to acquire the more expensive, high-performance mobile unit 120. As explained above, this benefits the mobile communications system as a whole because the use of high-performance units enables system capacity to be increased.

An exemplary mobile communications system for effecting the above-described capability-sensitive billing rates is shown in FIG. 4. For purposes of illustration, one low performance mobile unit 400 and one high performance mobile unit 410 are shown. The system could, however, handle many more than just one of each type of mobile unit. Radio communications between the mobile units 400, 410 and the system are accomplished by means of an antenna 420, coupled to a base station 430. The base station 430 is coupled to a mobile switching center 440. In accordance with the present invention, the mobile switching center 440 includes an automatic billing subsystem 441, whose operation comprises the steps described in either of the flow charts depicted in FIGS. 2 and 3. Alternatively, the automatic billing subsystem 441 could instead by included in a visitor location register (VLR) (not shown). In either case, the automatic billing subsystem 441 may be a general purpose digital computer that has been programmed to perform the functions described here. The writing of such a program is well-known to those of ordinary skill in the art, and is not described here in greater detail.

As more fully described above, each of the mobile units 400, 410 sends a signal that indicates whether it is of the low- or high-performance type. This information is relayed from the antenna 420 to the base station 430. The base station 430 utilizes this information to decide whether a low billing rate ("billing schedule A") should be used (in response to the mobile being a high performance mobile unit 410), or whether a high billing rate ("billing schedule B") should instead be used (in response to the mobile being a low performance mobile unit 400). A code designating the selected billing schedule is then transmitted from the base station 430 to the automatic billing subsystem 441 in the mobile switching center 440.

Receipt of the billing schedule code causes the automatic billing subsystem 441 to determine a charge for the call based on the capabilities utilized as well as on the accumulated amount of time during which these capabilities are utilized.

Upon call termination, a code that is representative of the accumulated charge for the call is transmitted from the automatic billing subsystem 441 to a home location register (HLR) (not shown) that corresponds to the mobile unit that is being billed. This transmission may be performed by means of either of the well-known signalling system No. 7, or IS41 protocols.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the described embodiment has focussed on the advantages to be gained by detecting the C/I requirements of a mobile unit, and adjusting transmitter power accordingly. However, the present invention is applicable to any situation where some, but not all, mobile units may be characterized by an advanced feature that improves system performance. In any such instance, the present invention teaches detecting whether a particular mobile unit has the advanced feature, and then modifying the operation of the system to take advantage of the advanced feature whenever it is detected. Additionally, the present invention teaches adjusting a billing rate when the advanced feature is detected, in order to encourage consumers to purchase the more expensive units that embody the advanced feature.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. In a cellular communications system including a base station and a mobile unit, a method for operating the base station, comprising the steps of:

detecting whether the mobile unit has a particular capability to receive signals at a lower signal-to-interference ratio; and adjusting operation of the base station to improve system performance in response to detection that the mobile unit has the particular capability, wherein improving system performance includes reducing consumption of spectral resources consumed in the cellular communications system.

2. The method of claim 1, wherein the step of detecting comprises:

receiving a signal from the mobile unit, wherein the signal is encoded to indicate whether the mobile station has the particular capability.

3. The method of claim 1, wherein the step of detecting comprises:

receiving an identifying signal from the mobile unit, wherein the identifying signal is encoded to identify from which one of a plurality of mobile units the identifying signal was received; and using the identifying signal to retrieve a capability-indicating code from a database.

4. The method of claim 1, wherein the particular capability to receive signals at the lower signal-to-interference ratio is due to the mobile unit utilizing diversity receiving techniques.

5. In a cellular communications system including a base station and a mobile unit, a method for operating the base station, comprising the steps of:

detecting whether the mobile unit has a particular capability to receive signals at a lower signal-to-interference ratio; and adjusting operation of the base station to improve system performance in response to detection that the mobile unit has the particular capability, wherein:

the step of adjusting operation of the base station comprises adjusting base station transmitter power to a reduced power range in response to detection that the mobile unit has the particular capability.

6. In a cellular communications system including a base station and a mobile unit, a method for operating the base station, comprising the steps of:

detecting whether the mobile unit has a particular capability to receive signals at a lower signal-to-interference ratio; and adjusting operation of the base station to improve system performance in response to detection that the mobile unit has the particular capability, wherein:

the base station includes a plurality of assignable frequencies, each assignable frequency being characterized by a re-use parameter that indicates re-use proximity of a nearest other base station that also includes the assignable frequency; and the step of adjusting operation of the base station comprises assigning, for use by the mobile unit, a selected one of the assignable frequencies that has a re-use parameter that indicates closer re-use proximity than a re-use proximity of another one of the assignable frequencies.

7. In a cellular communications system including a base station and a mobile unit, a method for operating the base station, comprising the steps of:

detecting whether the mobile unit has a particular capability to receive signals at a lower signal-to-interference ratio; and adjusting operation of the base station to improve system performance in response to detection that the mobile unit has the particular capability, wherein the step of adjusting operation of the base station comprises selecting, in response to detection that the mobile unit has the particular capability, a lower of two billing rates, and using the selected billing rate for governing automatic accumulation of charges for a call by or to the mobile unit.

8. In a cellular communications system including a base station and a mobile unit, an apparatus for controlling operation of the base station, comprising:

means for detecting whether the mobile unit has a particular capability to receive signals at a lower signal-to-interference ratio; and means for adjusting operation of the base station to improve system performance in response to detection that the mobile unit has the particular capability, wherein improving system performance includes reducing consumption of spectral resources consumed in the cellular communications system.

9. The apparatus of claim 8, wherein the detecting means comprises:

means for receiving a signal from the mobile unit, wherein the signal is encoded to indicate whether the mobile station has the particular capability.

10. The apparatus of claim 8, wherein the detecting means comprises:

means for receiving an identifying signal from the mobile unit, wherein the identifying signal is encoded to identify from which one of a plurality of mobile units the identifying signal was received;

means for using the identifying signal to retrieve a capability-indicating code from a database.

11. The apparatus of claim 8, wherein the particular capability to receive signals at the lower signal-to-interference ratio is due to the mobile unit utilizing diversity receiving techniques.

12. In a cellular communications system including a base station and a mobile unit, an apparatus for controlling operation of the base station, comprising:

means for detecting whether the mobile unit has a particular capability to receive signals at a lower signal-to-interference ratio; and means for adjusting operation of the base station to improve system performance in response to detection that the mobile unit has the particular capability, wherein:

the means for adjusting operation of the base station comprises means for adjusting base station transmitter power to a reduced power range in response to detection that the mobile unit has the particular capability.

13. In a cellular communications system including a base station and a mobile unit, an apparatus for controlling operation of the base station, comprising:

means for detecting whether the mobile unit has a particular capability to receive signals at a lower signal-to-interference ratio; and means for adjusting operation of the base station to improve system performance in response to detection that the mobile unit has the particular capability, wherein the means for adjusting operation of the base station comprises means for selecting a lower of two billing rates for billing the mobile unit in response to detection that the mobile unit has the particular capability.

* * * * *